Oct. 14, 1969 S. BOWMAN ET AL 3,472,405
MATERIAL HANDLING APPARATUS
Filed Aug. 26, 1968 6 Sheets-Sheet 1

FIG. 1.

INVENTORS.
SPENCER BOWMAN
ALAN S. McCLIMON
BY
ATTORNEY.

INVENTORS.
SPENCER BOWMAN
ALAN S. McCLIMON
BY
ATTORNEY.

Oct. 14, 1969  S. BOWMAN ET AL  3,472,405
MATERIAL HANDLING APPARATUS
Filed Aug. 26, 1968  6 Sheets-Sheet 6

INVENTORS.
SPENCER BOWMAN
ALAN S. McCLIMON
BY
ATTORNEY.

United States Patent Office 3,472,405
Patented Oct. 14, 1969

3,472,405
MATERIAL HANDLING APPARATUS
Spencer Bowman, Lakewood, Ohio, and Alan S. McClimon, Brookfield, Wis., assignors to Koehring Company, Milwaukee, Wis., a corporation of Wisconsin
Filed Aug. 26, 1968, Ser. No. 755,418
Int. Cl. B60p 1/04
U.S. Cl. 214—501                                    10 Claims

ABSTRACT OF THE DISCLOSURE

An overhead loader attachment for a dump wagon is adjustable up and down on a transverse pivot axis and also shiftable back and forth in the longitudinal direction of the wagon, the object being to drop successive scoop loads into the wagon selectively near its center or either end and to thereby load it to full capacity uniformly from end to end.

BACKGROUND OF THE INVENTION

Field of the invention

The invention relates to the handling of material such as rocks, gravel, sand and the like, and it is concerned more particularly with the loading, transporting and unloading of such material by means of a single piece of equipment.

Description of the prior art

Apparatus for loading, transporting and unloading materials of various kinds are well known, and as conventionally constructed they incorporate a self-propelled vehicle component, a dump bed on the vehicle chassis, and a loader attachment for the dump bed. The loader attachment, according to common practice, includes a scoop on an up and down swingable lift arm assembly, and in order to load the dump bed, the scoop is moved up and down in successive passes between a lowered material receiving positions in rear of the dump bed and a material discharging position over the bed.

Self-loading dump wagons of the above mentioned character, as heretofore known, are believed to have not been entirely satisfactory, particularly in the matter loading the dump bed to full capacity at a substantially uniform level from end to end. In such vehicles, the material dropped from the scoop tends to peak in the dump bed during successive loading passes, and if the bed is of substantial length it may remain only partly filled at the end of the loading cycle. This reduces the operating efficiency of the vehicle for hauling purposes.

SUMMARY OF THE INVENTION

In large scale material handling operations such as at road construction or dam building sites, dump vehicles of large material holding capacity are required in order to cut down the number of trips between the fill and the dump; and if the vehicle is of the self-loading type the scoop should likewise have substantial load handling capacity in order to reduce the number of necessary loading passes and consequently the loading time between trips.

While off-the-road travel of the vehicle is prevalent in such operations it is nevertheless desirable that the overall width of the vehicle does not exceed permissible limits for transport to the job site. This makes it necessary, if a large load holding capacity of the bed is required, to lengthen it, but lengthening of the bed presents the difficulty of filling the bed with an overhead loader to full capacity at a substantially uniform level from end to end.

The principal object of the present invention is to overcome that difficulty in a practical and fully satisfactory manner.

More specifically it is an object of the invention to provide an improved overhead loader attachment which may be selectively operated to drop material into a bed of substantial length at any desired point intermediate its ends. As a result it will be possible not only to level out the peaks of successive loading passes and to make full use of the cubic capacity of the bed, but also to provide a large self-loading vehicle, say of 20 ton capacity or larger, affording economic benefits on large scale material handling projects.

A further object of the invention is to provide an improved overhead loader attachment of the above mentioned character which will hug the dump bed closely and thereby reduce the required operating space, particularly above the bed.

A still further object of the invention is to provide an improved actuating mechanism for an overhead loader of the above mentioned character, which is powerful, simple and compact, and which has the necessary sturdiness to withstand extremely heavy operating stresses.

A still further object of the invention is to provide a self-loading dump vehicle incorporating an improved overhead loader attachment of the above mentioned character, and wherein the actuating mechanism of the attachment is well protected against damage by falling material during loading or unloading.

A still further object of the invention is to provide an improved overhead loader attachment of the above outlined character, incorporating a mechanism for lifting and lowering a scoop and shifting the raised scoop lengthwise of the bed, and wherein such mechanism is not exposed to abrasive and other injurious effects of the material being handled.

A still further object of the invention is to provide an improved self-loading dump wagon wherein the loaded as well as the empty bed will be substantially balanced fore and aft on the vehicle chassis, so that the loaded as well as the empty vehicle may be operated at relatively high traveling speeds.

These and other objects and advantages are attained by the present invention, various novel features of which will be apparent from the description herein of a preferred embodiment of the invention and will be pointed out in the appended claims.

Referring to the accompanying drawings.

Figure 1:
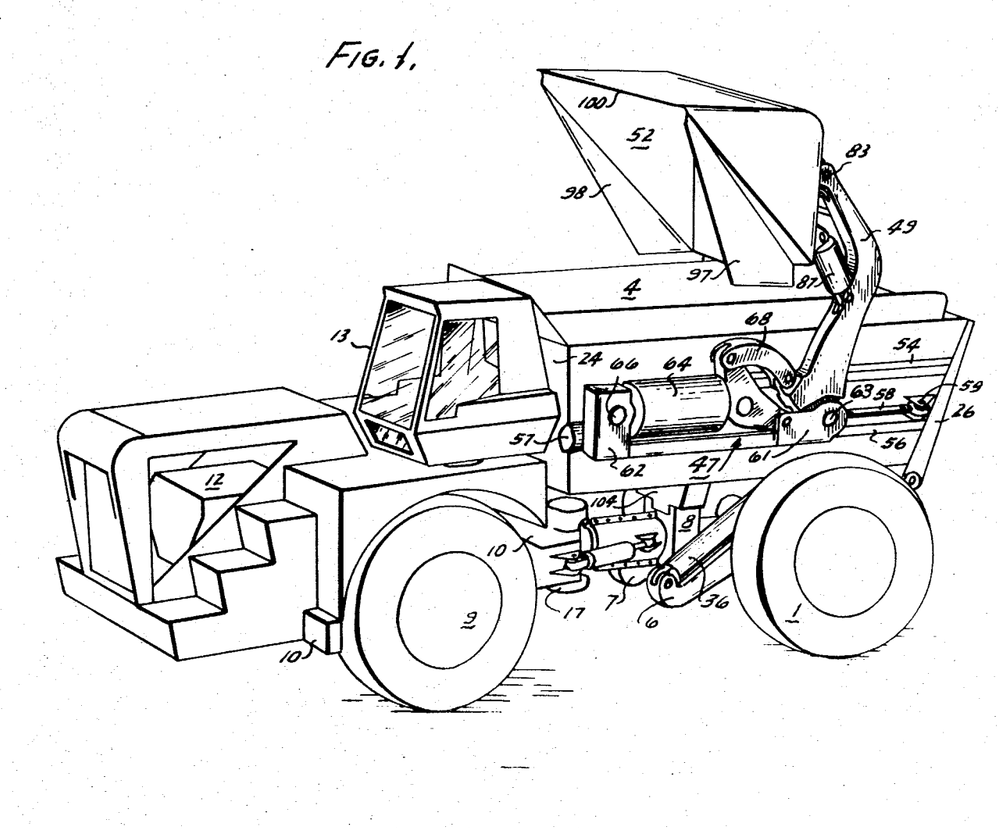
FIG. 1 is a perspective view of a self-loading dump vehicle in transport condition.

The vehicle shown in FIG. 1 generally comprises two units, a prime mover unit at the left and a wagon unit at the right. For purposes of definition the end of the vehicle at the left side of FIG. 1 will be designated as its front end, and the end at the right side of FIG. 1 will be designated as the rear end of the vehicle.

Figure 2:
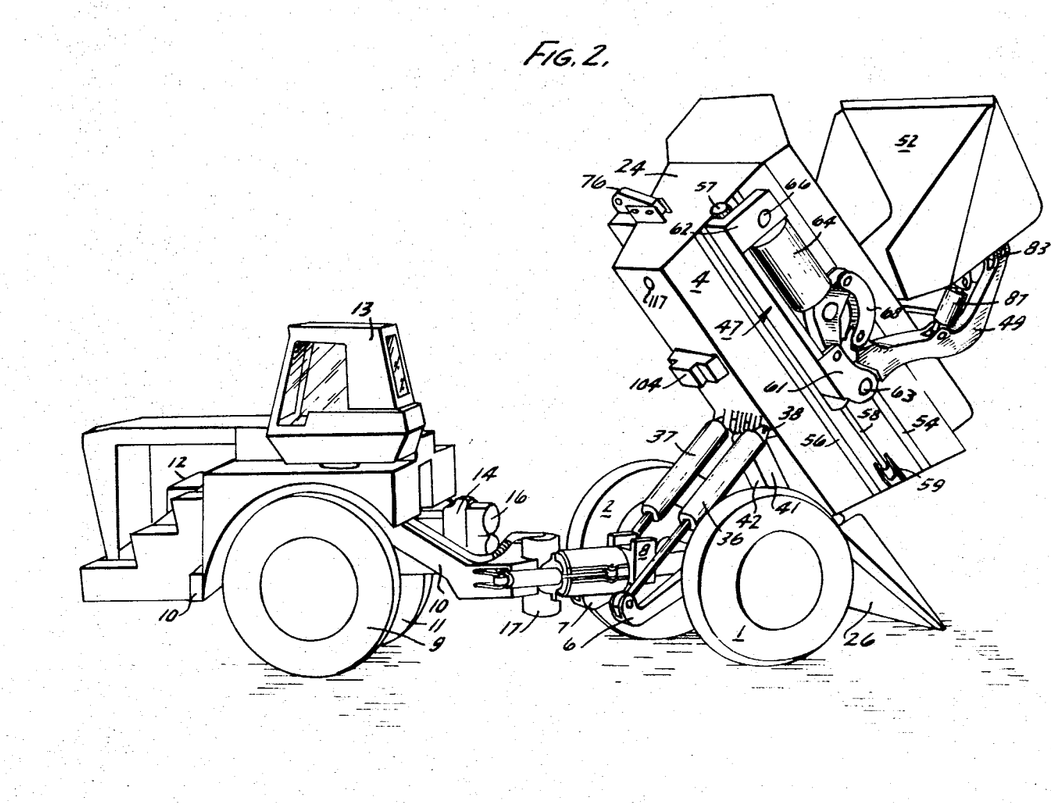
FIG. 2 is a perspective view of the dump vehicle of FIG. 1 adjusted to a dumping position.
Figure 3:
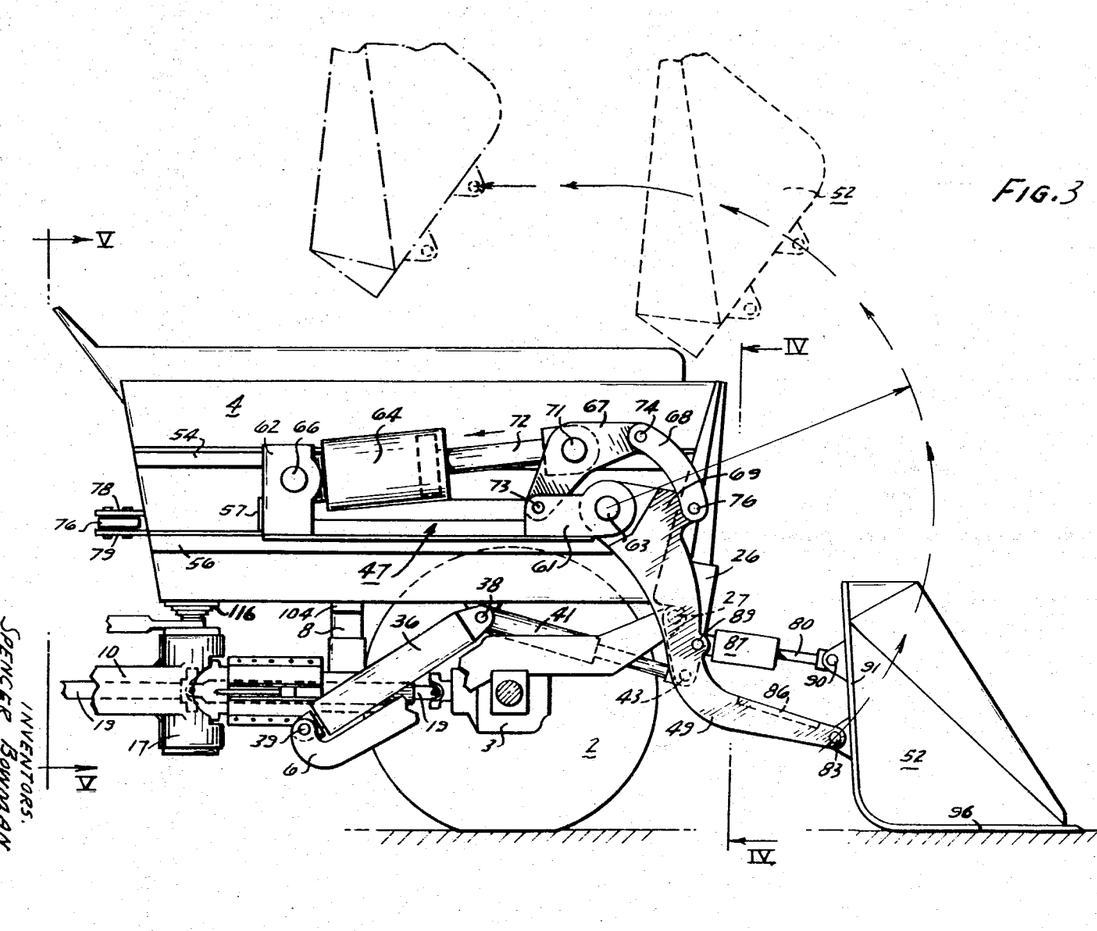
FIG. 3 is a side elevation of the rear component of the vehicle of FIG. 1 adjusted to a loading condition.

The wagon unit at the right of FIG. 1 comprises a wheeled rear chassis including left and right power driven supporting wheels 1 and 2 (FIG. 5) at opposite ends of an axle housing 3. A dump bed, generally designated by the reference character 4, is mounted on the rear chassis for up and down adjustment between a generally horizontal transport position as shown in FIG. 1, and an upwardly and rearwardly tilted dumping position as shown in FIG. 2. In the space between the wheels 1 and 2 (FIG. 5) the axle housing 3 mounts a pair of transversely spaced hollow side sills 6 and 7. The left side sill 6, as best shown in FIG. 3, is rigidly mounted intermediate its ends on the axle housing 3, and a rearward portion of the sill extends rearwardly and upwardly, and a forward portion of the sill extends forwardly and downwardly with respect to the axle housing. The right side sill 7 is a duplicate of the side sill 6, and a transverse connecting structure between the forwardly and downwardly extending portions of the chassis sills 6 and 7 includes a pillow block 8 forwardly of and in somewhat elevated relation to the rear axle housing 3.

The prime mover unit at the left of FIG. 1 comprises a wheeled chassis including left and right power driven supporting wheels 9 and 11 (FIG. 2), a superstructure including an internal combustion engine 12, a driver's cab 13, a transmission unit 14 (FIG. 2) and a hydraulic pump aggregate 16. A swivel joint generally designated by the reference character 17 (FIGS. 2 and 3) connects the chassis of the prime mover unit with the chassis of the wagon unit. The swivel joint affords a vertically rigid load transmitting connection between the prime mover and wagon units, and it provides a vertical pivot axis on which the prime mover and wagon units may be angled relative to each other for steering, and a horizontal pivot axis on which the prime mover and wagon units may rock laterally relative to each other while traveling over uneven terrain. A steering cylinder for angling the prime mover and wagon units about the vertical pivot axis of the swivel joint 17 is indicated at 18 in FIG. 1, and flexible shafting for transmitting driving power from the transmission 14 (FIG. 2) to the rear wheels 1 and 2 is indicated at 19 in FIG. 3.

Figure 4:
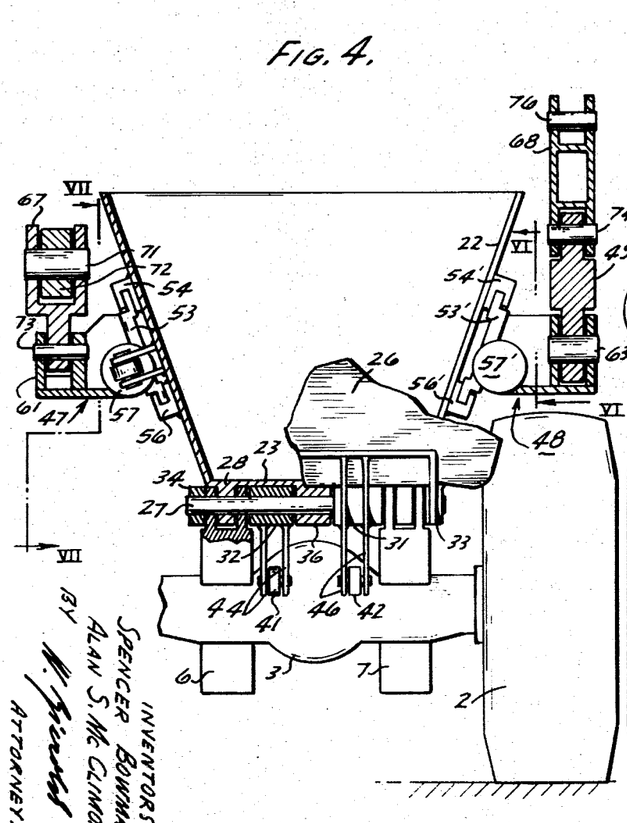
FIG. 4 is an elevational end view of the dump vehicle of FIG. 1, looking toward the gate end of the wagon unit.

Referring now in greater detail to the construction of the wagon unit, the dump bed 4 comprises opposite, fore and aft extending left and right side walls 21, 22 (FIG. 4), a bottom wall 23, a forward end wall 24 (FIG. 1) between the side walls, and a tail gate 26 which when closed forms a rear end wall between the side walls 21, 22. A cross shaft 27 (FIG. 4) at the rear, lower corner of the dump bed 4 (FIG. 3) serves the dual function of pivotally connecting the dump bed 4 with the rear ends of the chassis sills 6 and 7, and of pivotally mounting the tail gate 26 in cooperative relation to the bottom and side walls of the dump bed. As shown in FIG. 4, the chassis sill 6 has a bifurcated end which straddles a depending lug 28 of the dump bed, and the chassis sill 7 has a bifurcated end which straddles a depending lug 29 of the dump bed. The tail gate, part of which is shown in FIG. 4, has hubs 31 and 32 in the space between the sills 6 and 7, and outboard hubs 33 and 34. The cross shaft 27 extends through aligned bores of the sills 6 and 7, lugs 28, 29, a center lug 36 of the dump bed, and hubs 31, 32, 33, 34 of the tail gate.

Pivotal adjustment of the dump bed 4 about the axis of the cross shaft 27 is effected by means of two hydraulic dump rams 36 and 37 as best illustrated by FIG. 2. The cylinder of the ram 36 is pivotally secured at 38 to a lug depending intermediate the front and rear ends of the dump bed from its bottom wall 23, and the piston rod of the ram 36 is pivotally secured to the forward end of the chassis sill 6 on a center 39 which, as shown in FIG. 3, is offset forwardly and downwardly with respect to the axle housing 3. The dump ram 37 is similarly interposed between the dump bed and the chassis sill 7.

The tail gate 26 is swung up and down about the axis of the cross shaft 27 by two hydraulic rams 41 and 42 at the under side of the dump bed 4. As shown in FIG. 3, the cylinder of the ram 41 has a pivot connection with the bed 4 on the same transverse axis as the dump rams 36, 37, and the piston rod of the ram 41 has a pivot connection 43 with an actuating arm 44 (FIG. 4) secured to the hub 32 of the tail gate. The gate operating ram 42 is similarly interposed between the dump bed and an actuating arm 46 secured to the gate hub 31 (FIG. 4).

The dump bed 4 is equipped with an overhead loader attachment which comprises the following principal components. A fore and aft adjustable support at the left side of the dump bed and generally designated in FIGS. 1, 2, 3, 4 and 5 by the reference character 47; another fore and aft shiftable support 48 (FIGS. 4, 5 and 7) which is an opposite hand duplicate of the support 47 and located at the right side of the dump bed; an assembly of left and right transversely spaced lift arms 49 (FIG. 1) and 51 (FIG. 7) which straddle the dump bed and are connected to the supports 47, 48 for pivotal up and down movement relative thereto and fore and aft movement therewith relative to the bed 4; and a scoop 52 which is tiltably mounted on the swinging ends of the lift arms 49 and 51.

Figures 6, 7, 8, 12:
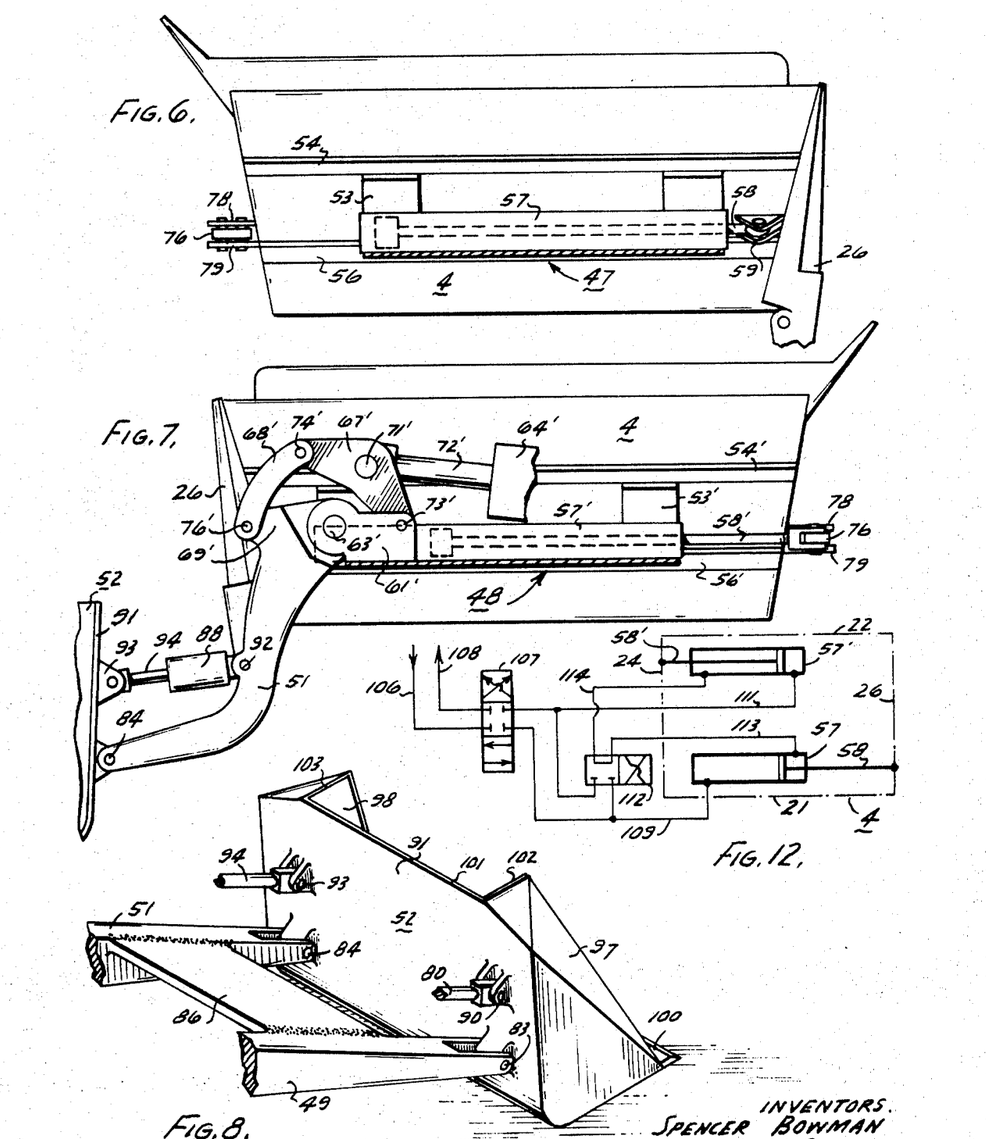
FIG. 6 is a simplified sectional view on line VI—VI of FIG. 4.
FIG. 7 is a simplified sectional view on line VII—VII of FIG. 4.
FIG. 8 is a perspective view of a loader scoop and associated parts.
FIG. 12 is a hydraulic circuit diagram.

The support 47 at the left side of the bed and as shown in FIG. 4 comprises a plate like base 53 which is slidably fitted between an upper guide rail 54 and a lower guide rail 56 on the bed side wall 21. The guide rails 54, 56 extends straight the full length of the bed and parallel to its top edge, each rail being rigidly secured to the side wall 21, as by welding. Integrally connected with the base 53 of the support 47 is the cylinder of a hydraulic shift ram 57 as illustrated by FIG. 6. The piston rod 58 of the shift ram 57 extends through the rearward gland end of the ram and is anchored at the rear end of the bed in a bracket 59 on the side wall 21. Accordingly, admission of pressure fluid into the barrel end of the ram cylinder will cause forward sliding movement of the support 47 on the guide rails 54, 56, and admission of pressure fluid into the gland end of the ram 57 will have the opposite effect.

Also integrally connected with the base 53 of the support 47 and laterally outward from the shift cylinder 57 are brackets 61 and 62 at the rearward and forward ends, respectively, of the support 47. The rearward bracket 61 is bifurcated as shown in FIG. 4, and pivotally mounts the lift arm 49 by means of a pivot pin 63. The forward bracket 62 is similarly bifurcated and pivotally mounts the cylinder of a hydraulic lift ram 64 by means of a pivot pin 66.

The lift ram 64 is operatively connected with the lift arm 49 through an articulated linkage which includes a rocker 67, an arcuate link 68, and a relatively short radial arm portion 69 of the lift arm 49. The rocker 67 comprises a lever which has a pivot connection 71 with the piston rod 72 of the lift ram 64, a radial arm which has a pivot connection 73 with the bracket 61, and another radial arm which has a pivot connection 74 with the link 68. The pivot connection 73 of the rocker 67 with the bracket 61 is located on the support 47 in the space between the lift arm pivot axis 63 and the lift ram pivot axis 66. The short arm 69 of the lift arm 49 has a pivot connection 76 with the link 68, and in the condition of the parts as shown in FIG. 3 which places the scoop 52 into a lowered, material receiving position, the pivot connection 76 is located horizontally rearward of the lift arm pivot axis 63.

The foregoing description of the lift arm 49 and its actuating mechanism at the left side of the dump bed 4 analogously applies to the lift arm 51 (FIG. 7) and its actuating mechanism at the right side of the dump bed. That is, upper and lower guide rails 54', 56' (FIG. 7)

for the base 53' (FIG. 5) of the support 48 are secured to the side wall 22 of the bed; a shift ram for the support 48 has a cylinder 57' and a piston rod 58'. A lift cylinder 64' has a forward pivot connection, not shown, with the support 48 in transverse alignment with the pivot pin 66 (FIG. 3) at the left side of the bed; the lift arm 51 has a pivot connection 63' with the support 48 in transverse alignment with the pivot pin 63 at the left side of the bed; a rocker 67' has a pivot connection 73' with the support 48; the piston rod 72' of the lift ram 64' has a pivot connection 71' with the rocker 67'; an arcuate link 68' has a forward pivot connection 74' with the rocker 67'; and a short arm portion 69' has a pivot connection 76' with the rear end of the arcuate link 68'.

A difference, however, should be noted in the arrangement of the shift rams 57 and 57'. The cylinder of the shift ram 57 at the left side of the bed, as previously explained, has a forward barrel end and a rearward gland end, and the associated piston rod 58 is anchored at the rear end of the dump bed, as shown in FIG. 6. The cylinder of the shift ram 57' at the right side of the bed, on the other hand, has a rearward barrel end and a forward gland end, and the associated piston rod 58' is anchored at the forward end of the dump bed as shown in FIG. 7.

Figure 5:
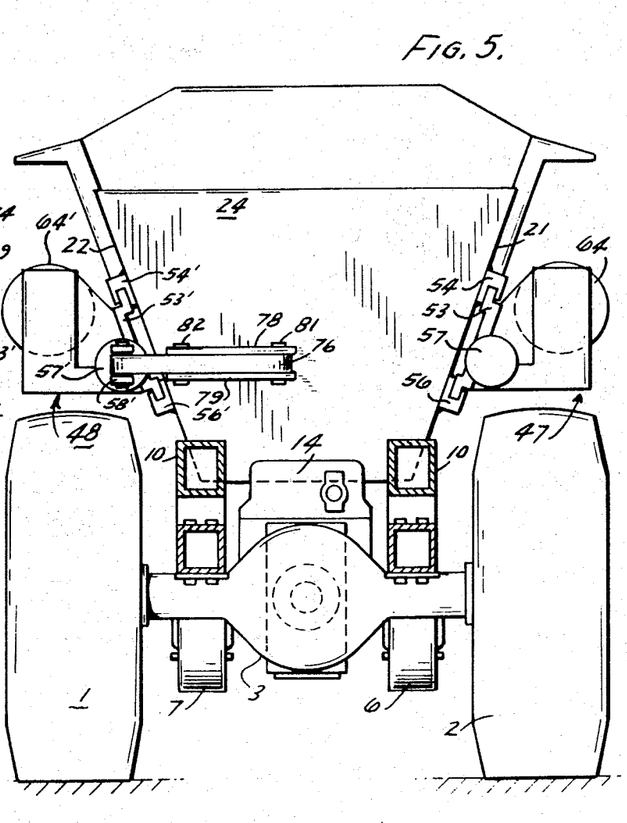
FIG. 5 is an elevational end view on line V—V of FIG. 3.

For purposes of disassembly, the support 47 may be slid forwardly, that is to the left in FIG. 3, out of the guide rails 54, 56. In order to permit a similar removal of the support 48 out of the guide rails 54', 56', that is to the right of FIG. 7, a nose piece 76 (FIG. 2) is detachably mounted on the forward end wall 24 of the dump bed, and the piston rod 58' is detachably connected to an end portion of the nose piece which projects laterally beyond the side wall 22 of the dump bed. As best shown in FIG. 5, the nose piece 76 is detachably retained between upper and lower bracket plates 78, 79 on the front wall 24 of the bed 4 by means of withdrawable pins 81 and 82. Removal of the nose piece from the bracket plates 78, 79 clears the forward end of the bed 4 for forward withdrawal of the support 48 from the guide rails 54', 56'.

The scoop 52 (FIG. 8) has transversely spaced pivot connections 83, 84 with the swinging ends of the lift arms 49 and 51, respectively. A strong cross web 86 solidly ties the lift arms together in back of the scoop. Pivotal adjustment of the scoop about the axis of the pivot connections 83, 84 is effected by tilting rams 87 (FIG. 1) and 88 (FIG. 7). As best shown in FIG. 3, the cylinder of the tilting ram 87 has a pivot connection 89 with the left arm 49 about midway between the pivot centers 63, 83; and the piston rod 80 of the tilting ram 87 has a pivot connection 90 with the back wall 91 of the scoop. The other tilting ram 88 (FIG. 7) is similarly interposed between the lift arm 51 and the back wall 91; a pivot 92 for the cylinder of the tilting ram 88 on the lift arm 51 being transversely aligned with the pivot 89 on the lift arm 49, and a pivot 93 for the piston rod 94 of the ram 88 being transversely aligned with the pivot 90 on the back wall 91.

The bottom wall 96 of the scoop has a cutting edge 100 which extends transversely of the vehicle across and somewhat beyond the tracks of the rear wheels 1 and 2. Side walls 97 and 98 of the scoop converge toward the free edge 101 of the back wall 91 which is of shorter transverse length than the cutting edge 100. When the scoop is raised to overhead discharging positions as indicated by dotted lines in FIG. 3, material dropping from the scoop will be funneled into the dump bed by the converging side walls 97 and 98. To avoid lateral spilling of material beyond the longitudinal top edges of the bed, the side walls 97, 98 of the scoop are suitably inclined and enlarged adjacent the material discharge edge 101 of the back wall as indicated at 102 and 103 in FIG. 8.

FIG. 3 shows the wagon unit ready for the beginning of a loading cycle. The dump rams 36, 37 are fully contracted and the dump bed is sustained in a horizontal position on the cross shaft 27 and on the pillow block 8 of the rear chassis. A bumper pad 104 (FIG. 2) at the underside of the bed 4 has a depending dowel lug which is seated in a recess of the pillow block to secure the bed against lateral displacement on the chassis. The gate actuating rams 41, 42 are fully extended and hold the tail gate 26 in its closed position. The lift arm supports 47, 48 are hydraulically locked, as will be explained later, in their rearmost positions by the shift rams 57, 57'; the lift rams 64, 64' are fully extended; and so are the tilting rams 87, 88. The bottom wall 96 of the scoop 52 rests on the ground, and the back wall 91 is kept upright by the extended tilting rams 87, 88. In this condition of the wagon unit the pivots 90, 93 (FIG. 8) which connect the tilting rams 87, 88 with the scoop are located above the tilting axis of the scoop afforded by the pivot connections 83, 84.

In order to fill the scoop, its cutting edge 100 may be crowded into a pile of material by slight backward movement of the vehicle. Subsequent admission of pressure fluid into the gland ends of the lift cylinders 64, 64' will cause upward movement of the scoop about the pivot centers 63, 63' which are in transverse alignment with each other on a horizontal axis intermediate the height between the bottom and top of the dump bed. During such upward movement of the scoop its cutting edge 100 will dig deeper into the pile while the vehicle is locked against movement. Contraction of the lift rams 64, 64' may be continued until the lift arm and scoop assembly arrives in the full line position of FIG. 9. Contraction of the tilt cylinders 87, 88 will then swing the scoop into the dotted line discharge position from which material will drop into the rear part of the dump bed as indicated by arrow A.

Figures 9, 10:
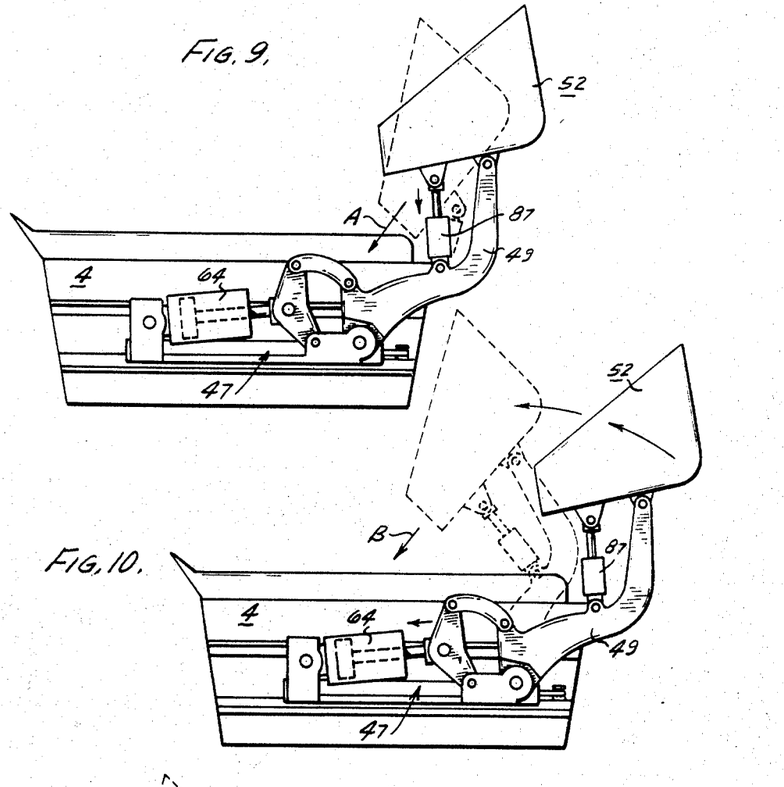
FIGS. 9, 10 and 11 are diagrammatic views of the rear vehicle component of FIG. 3 in various conditions of adjustment.

FIG. 10 shows the lift arm and scoop assembly in full lines the same as FIG. 9, and in a dotted line position which will cause material to drop from the scoop into the center part of the bed as indicated by arrow B. Adjustment of the lift arm and scoop assembly from the full line to the dotted line position of FIG. 10 is effected by full contraction of the lift rams 64, 64' without contracting the tilting rams 87, 88 from their fully extended conditions.

Figure 11:
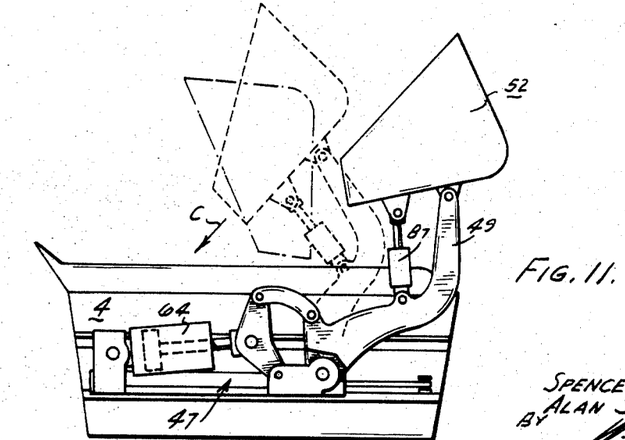

FIG. 11 shows the lift arm and scoop assembly in a full line position to which it may be adjusted by first actuating the lift rams 64, 64' while the supports 47, 48 are in their rearmost positions so as to bring the scoop and lift arm assembly into the full line position of FIG. 9, and by then actuating the shift rams 57, 57' so as to move the supports 47, 48 to their forward limit positions on the dump bed.

Adjustment of the lift arm and scoop assembly from the full line to the dotted line position of FIG. 11 may be effected by full contraction of the lift rams 64, 64' without contracting the tilting rams 87, 88 from their fully extended conditions. The arrow C in FIG. 11 indicates the direction in which material may drop from the dotted line position of the scoop into the forward part of the dump bed. The dash-dotted line position of the scoop in FIG. 11 indicates a shake-out position to which it may be adjusted by contraction of the tilting rams while the lift arm assembly is maintained in the dotted line position of FIG. 11.

Successive loading passes of the scoop into the FIG. 9, 10 and 11 positions, or into any desired intermediate positions will enable an operator to evenly fill the dump bed from end to end to a substantially uniform height and to full loading capacity.

Pressure fluid for actuating the various rams is supplied by the pump aggregate 16 (FIG. 2) on the prime mover unit. A hydraulic control system will be connected with the pump aggregate and include hose lines (not shown) and a bank of distributing valves in the operator's cab 13. In order to place the operator into different positions from which he can most efficiently manipulate the vehicle during loading, unloading and in transit, the cab may be rotatably mounted on the prime mover for selective adjustment into a forwardly facing position or into a sidewise facing position which will enable the operator to observe the left corner of the scoop cutting edge 100 when the scoop is in the lowered position shown in FIG. 3.

FIG. 12 shows a hydraulic circuit diagram for contrilling the shifts rams 57 and 58'. Pump pressure is directed through a pressure line 106 to a 4-way, 3-position, closed center directional control valve 107, and an exhaust line 108 leads from the valve 107 back to the pump aggregate 16. The barrel ends of the rams 57 and 57' are connected with the valve 107 by fluid lines 109 and 111, respetcively. Branch lines of the lines 109 and 111 lead to a 4-way, 2-position directional valve 112, and lines 113, 114 lead from the valve 112 to the gland ends of the rams 57, 57' respectively.

In the diagram of FIG. 12, the cylinders of the rams 57, 57' are shown adjusted to their maximum forward positions on the bed 4, which correspond to the maximum forward positions of the supports 47, 48 (FIG. 11). The valve 112, in the position shown in FIG. 12 connects the gland end of cylinder 57' with the gland end of cylinder 57, and the cylinders are thus connected in series. Consequently, when pressure fluid is admitted to the barrel end of cylinder 57' by downward shift of the valve 107 from the position shown in FIG. 12, fluid will be displaced from the gland end of cylinder 57' into the gland end of cylinder 57, and both cylinders will move in precise unison with each other toward their rearmost positions on the bed 4. The supports 47, 48 will therefore likewise travel in precise unison with each other from their forwardly adjusted positions (FIG. 11) to their rearwardly adjusted positions (FIG. 9). Conversely, upward shift of the valve 107 from the position shown in FIG. 12 while the valve 112 is in the position shown will cause forward movement of the supports 47, 48 in precise unison with each other. This will avoid undesirable twisting strains in the lift arm assembly 49, 51, 86.

When the supports 47, 48 are adjusted to their rearmost positions and the scoop is in its lowered position (FIG. 3), crowding of the scoop into a pile, will set up a considerable forward thrust upon the supports 47, 48. In order to resist such thrust most effectively the valve 112 may be adjusted to the left from the position shown in FIG. 12 while the valve 107 is in its downwardly adjusted position. As a result, pump pressure will be simultaneously admitted to the barrel end of cylinder 57' and to the gland end of cylinder 57, thereby boosting the rearward thrust upon the supports 47 and 48.

The transverse axis on which the pivot pins 63 (FIG. 3) and 63' (FIG. 7) for the lift arms 49, 51 are aligned, is located intermediate the height of the bed 4, that is, at a location which provides for a relatively short length of the lift arms. Consequently, the dump bed will be closely hugged by the loader attachment, and the required operating space for the attachment, particularly over the bed, will be relatively small.

The actuating mechanisms for the lift arms at the opposite sides of the bed, comprising the shift cylinders 57, 57', the lift cylinders 64, 64' and the linkages 67, 68 and 67' 68', are simple and compact, and amply strong to withstand severe operating stresses. Under excessive loads the arcuate links 68, 68' afford a limited amount of give as they deflect in arc flattening or arc bowing directions. Overhanging portions of the dump bed protect the mechanisms against damage from falling material during the loading of the bed. Shielding, not shown, may readily be attached to the linkage to prevent its becoming packed with mud. The scoop 52 is of ample size to handle a substantial quantity of material with each loading stroke.

After the dump bed has been loaded, the overhead loader attachment is preferably adjusted to the condition illustrated by FIG. 1, wherein the supports 47, 48 are located in their extreme forward positions, and the weight of the scoop contributes to placing the center of gravity of the load carried by the rear wheels 1 and 2 upon the rear chassis at a forward spacing from the rear wheel axis.

FIG. 2 which shows the vehicle in dumping condition is believed to be self-explanatory in view of the foregoing description. The dump bed may have a double walled bottom into which the exhaust of the engine 12 may be conducted for heating purposes through an exhaust pipe 115 (FIG. 3), bellows coupling 116 and bottom aperture 117 (FIG. 2).

It is claimed and desired to secure by Letters Patent:

1. A material handling apparatus comprising, a dump bed having fore and aft extending side walls and front and rear end walls between said side walls; a scoop; and mounting means for said scoop connected with said side walls and operable to selectively adjust said scoop either to a lowered material receiving position rearwardly of said bed or over said bed to different positions of fore and aft adjustment in material discharging relation thereto; said scoop mounting means including a fore and aft reciprocable support on each of said side walls, shift means operatively interposed between said dump bed and said supports for adjusting the latter in unison with each other fore and aft relative to said bed, an assembly of transversely spaced lift arms tiltably mounting said scoop and pivotally connected with said supports for up and down swinging movement thereon and for fore and aft movement therewith relative to said dump bed; and lift means operatively interposed between at least one of said supports and said lift arm assembly for swinging the latter up and down about its pivot connections with said supports.

2. An apparatus as set forth in claim 1 and further comprising hydraulic tilting ram means for said scoop, pivot means connecting said tilting ram means with said scoop on a center which in said lowered position of said scoop is located above its tilting axis on said lift arm assembly, and pivot means connecting said tilting ram means with a portion of said lift arm assembly between said supports and said scoop.

3. An apparatus as set forth in claim 1, wherein said shift means comprise a pair of hydraulic rams, one operatively interposed between the support and dump bed at one side of the latter, and the other operatively interposed between the support and dump bed at the other side of the latter.

4. An apparatus as set forth in claim 3, wherein the cylinders of said rams are secured, respectively, to said supports, and wherein the piston rods of said rams are anchored on said dump bed.

5. An apparatus as set forth in claim 4, wherein the piston rod of one of said rams is anchored on a forward portion of said dump bed, and wherein the piston rod of the other of said rams is anchored on a rearward portion of said dump bed.

6. A material handling apparatus comprising a dump bed having fore and aft extending side walls and front and rear walls between said side walls; a scoop; and mounting means for said scoop connected with said side walls and operable to selectively adjust said scoop either to a lowered material receiving position rearwardly of said bed or over said bed to different positions of fore and aft adjustment in material discharging relation thereto; shift means operatively interposed between said bed and said mounting means for reciprocating the latter fore and aft relative to said bed; said scoop mounting means comprising an assembly of transversely spaced lift arms straddling said bed and swingably mounted thereon for up and down adjustment on a transverse pivot axis intermediate the height of said bed; means tiltably connecting said scoop with the swinging end of said lift arm assembly; and, at least at one side of said bed, a hydraulic lift ram having a first pivot center forwardly of said pivot axis, a rocker having a second pivot center intermediate said pivot axis and said first pivot center, pivot means operatively connecting the reciprocable element of said lift ram with said rocker, and a link pivotally connected at its opposite ends, respectively, with said rocker and lift arm assembly.

7. A material handling apparatus as set forth in claim 6 wherein said link is pivotally connected with said lift arm assembly on a center which in said lowered position of said scoop is located rearwardly of said pivot axis.

8. A material handling apparatus as set forth in claim 6, wherein said rocker comprises a lever pivotally connected to said reciprocable element of said lift ram and having a radial arm pivoted at said second pivot center, and another radial arm pivotally connected with said link.

9. An apparatus as set forth in claim 6 wherein said link is arc shaped between its pivotal connections with said rocker and lift arm assembly.

10. An apparatus as set forth in any one of claims 1 through 9, and further comprising a vehicle chassis supporting said dump bed for pivotal up and down adjustment about a transverse pivot axis.

References Cited

UNITED STATES PATENTS

| | | | |
|---|---|---|---|
| 1,451,020 | 4/1923 | Greenleaf. | |
| 2,498,144 | 2/1950 | Thomas | 214—78 |
| 2,624,478 | 1/1953 | Kaplan | 214—501 |
| 3,254,781 | 6/1966 | Zink | 214—501 |

ALBERT J. MAKAY, Primary Examiner

U.S. Cl. X.R.

214—78, 146.5, 776